March 19, 1968 J. J. MANCE ETAL 3,374,045

DIELECTRIC HEAT AND PRESSURE EMBOSSED REFLECTOR ASSEMBLY

Original Filed May 15, 1963 2 Sheets-Sheet 1

INVENTOR.
John J. Mance, &
BY Ralph M. Stallard
E. J. Biskup
ATTORNEY

March 19, 1968 J. J. MANCE ETAL 3,374,045
DIELECTRIC HEAT AND PRESSURE EMBOSSED REFLECTOR ASSEMBLY
Original Filed May 15, 1963
2 Sheets-Sheet 2
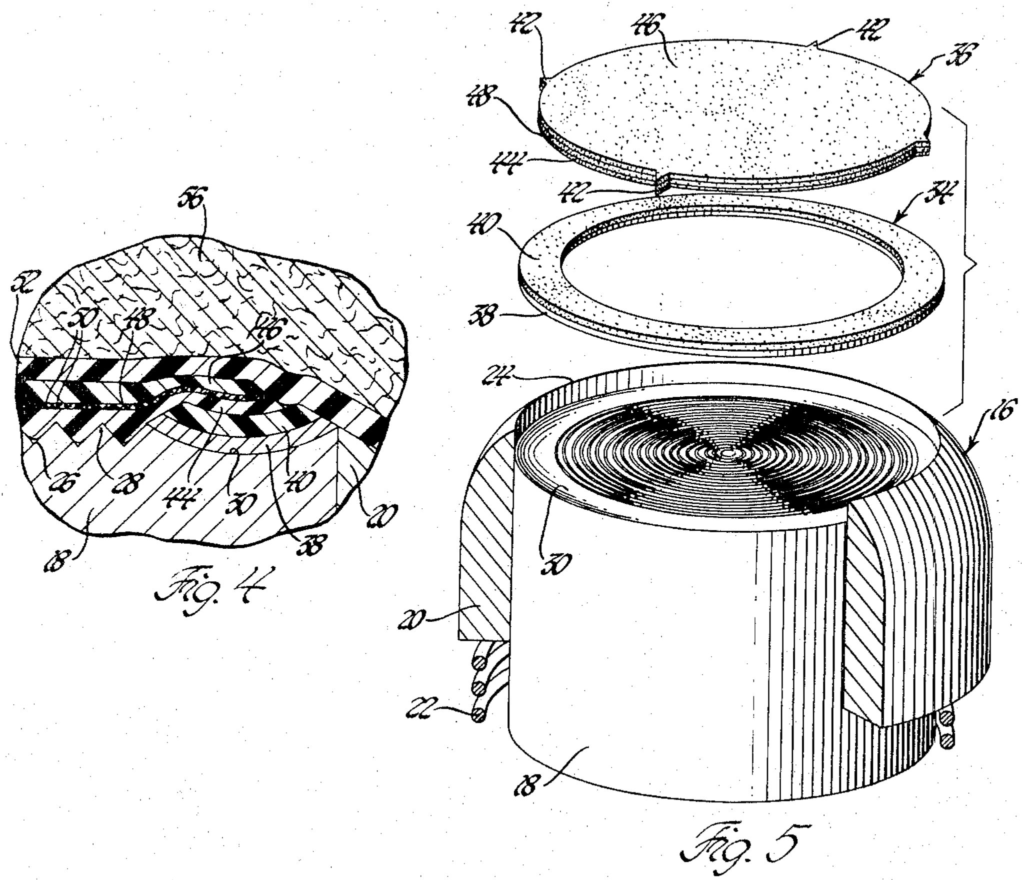
Fig. 4
Fig. 5
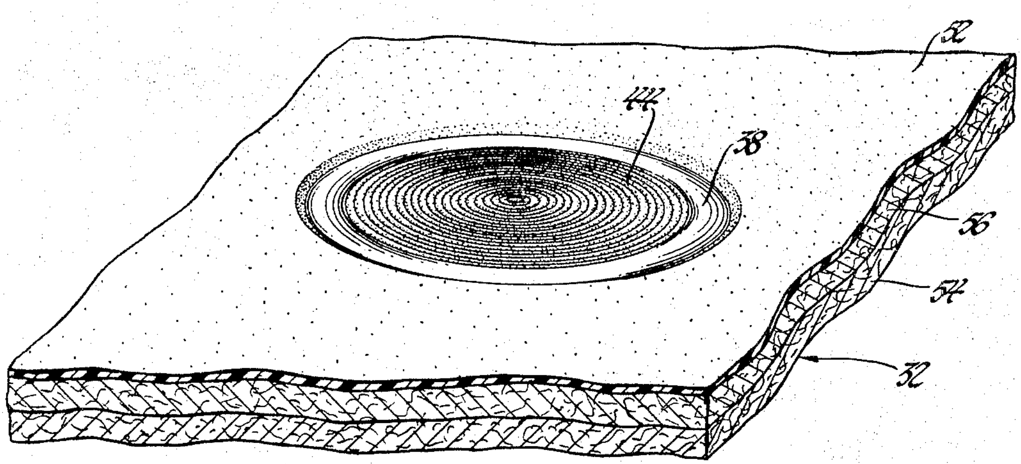
Fig. 6
INVENTOR.
John J. Mance, &
BY Ralph M. Stallard
E. J. Biskup
ATTORNEY

United States Patent Office 3,374,045

Patented Mar. 19, 1968

3,374,045

DIELECTRIC HEAT AND PRESSURE EMBOSSED REFLECTOR ASSEMBLY

John J. Mance, Huntington Woods, and Ralph M. Stallard, Rochester, Mich., assignors to General Motors Corporation, Detroit, Mich., a corporation of Delaware Original application May 15, 1963, Ser. No. 280,681. Divided and this application Oct. 17, 1966, Ser. No. 587,032

1 Claim. (Cl. 350—105)

ABSTRACT OF THE DISCLOSURE

A dielectric heat and pressure embossed reflector assembly door trim panel. The reflector assembly comprises a sheet of opaque vinyl fused to the cover sheet of the trim panel. A sheet of translucent acrylic resin having a plurality of V-shaped grooves formed in one surface thereof is bonded to the acrylic sheet by a layer of adhesive having a plurality of glass beads disposed therein. A metallic rim surrounds the sheet of acrylic resin and is fused to the cover sheet.

This is a division of United States Ser. No. 280,681, filed May 15, 1963, in the name of Mance et al., and entitled, "Method of Dielectrically Embossing a Reflector Button on a Trim Panel."

This invention pertains to a decorative reflective article for the trim panel of an automobile door.

The automotive industry has at times placed reflector buttons on trim panels because, at nighttime, they may serve to reflect the headlight beams of an oncoming vehicle and thereby alert the driver to the danger of an open door. Heretofore such buttons have been manufactured as separate items and frequently comprise a glass lens and metal support that is mechanically fastened to the trim panel. As should be apparent, a reflector of this sort is relatively costly and its assembly to the trim panel adds an additional operation in the fabrication of the latter.

At present, it is common practice to form most of the trim panel by a dielectric heating process which utilizes an alternating current of radio frequency for generating heat in dielectric material. This process has eliminated time-consuming operations such as sewing and provides bonding and embossment of the inner trim at substantial cost savings over previously used methods. Because this is well recognized, it has become increasingly important to utilize this process not only for forming decorative impressions in the cover sheet of the trim panel but also for other uses which enhance the decorative appearance and function of the panel. However, until now it has not been known how to form and bond a reflector button on a trim panel by dielectric embossing.

Accordingly, the principal object of this invention is to provide a reflector button on a trim panel that is formed by dielectric embossing.

Another object of the present invention is to provide a reflector button having a thermoplastic reflecting portion and a metallic strip, both of which are bonded to a trim panel by dielectric embossing.

A further object of the present invention is to provide a decorative reflective article for a trim panel that includes a metallic molding on a thermoplastic base sheet and is formed by dielectric embossing.

These and other objects will be readily apparent from the following detailed description of the invention which was made with reference to the drawings, in which:

FIGURE 4 is an enlarged view of a portion of the reflector button as seen in FIGURE 3;

FIGURE 5 is an isometric view showing the construction of the die and components of the reflector button prior to embossment, and FIGURE 6 is an isometric view illustrating the final article derived from this process.

Figure 1:
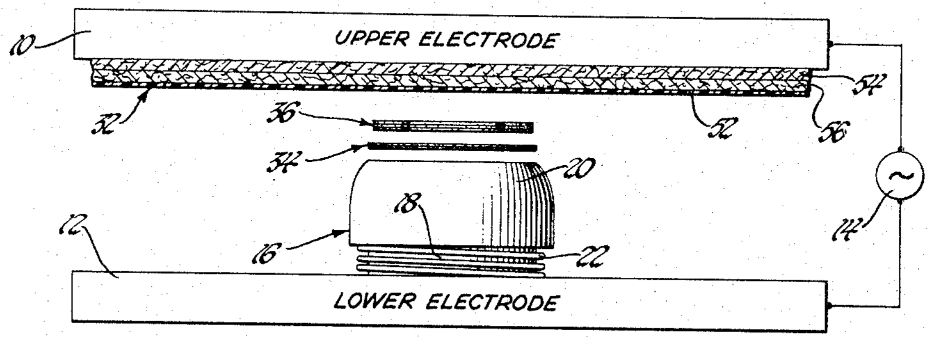
FIGURE 1 is a schematic view taken on a vertical section of a dielectric heating press showing a trim panel and the components of a reflector button positioned prior to embossment.

Referring now to FIGURE 1 of the drawings, a dielectric heating press is shown comprising an upper electrode 10 and a lower electrode 12, both of which are connected in series with a high frequency alternating current generator 14. The upper electrode is movable through operating means, not shown, toward and away from the lower electrode while the generator is capable of impressing an alternating current at a frequency between one and 100 megacycles between the electrodes. This type of heating press is well known in the art and therefore a detailed description regarding this press is not believed to be necessary, however, for further information regarding its operation reference is made to Dusina et al. 2,946,713.

The lower electrode 12 rigidly supports a die construction 16 which as seen in FIGURE 5 comprises a cylindrical embossing member 18 surrounded by a sleeve-type diffuser blade 20 that is seated on a coil spring 22 resting on the upper surface of the electrode 12. The diffuser blade preferably is made from aluminum and has the upper end thereof terminating in a sharp annular point 24. In the normal position of the die construction, the upper portion of the diffuser blade is elevated by the coil spring slightly above the top surface of the embossing member 18, as seen in FIGURE 5.

The embossing member 18 is preferably made from stainless steel and, as seen in FIGURES 4 and 5, has the upper surface thereof formed with a plurality of concentric circular grooves 26 which progressively are larger in diameter from the center of the embossing member toward the periphery thereof. These grooves are equally and closely spaced from each other approximately .031 inch between centers so as to form a plurality of circular inverted V-shaped concentric peaks 28 for purposes to be explained hereinafter. Adjacent the periphery of the embossing member, an enlarged annular groove 30 which is arcuate in cross section, is formed so as to have a width substantially greater than any of the aforementioned grooves.

At this point, it should be mentioned that the above-described die construction and heating press are used in accordance with the invention for forming an ornamental reflector button on a base such as a trim panel 32 of an automobile door. The reflector button is made from a bezel portion 34 and a disc-shaped reflector portion 36 by the dielectric embossing process described below.

Figure 2:
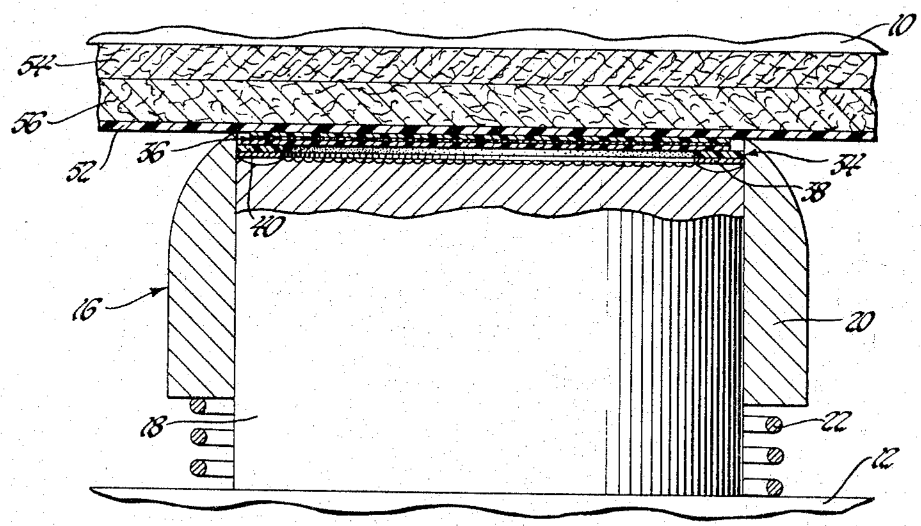
FIGURE 2 is an enlarged view of the embossing die construction and the elements of the reflector button at the closing of the press but prior to the application of pressure and high frequency electrical energy.

To practice the invention, initially the bezel portion 34 which comprises a precut metallic annulus 38 coated on one side thereof with a thin sheet of polyvinyl chloride 40 is positioned on the enlarged groove 30 of the die construction 16 with the metallic portion of the bezel portion contacting the embossing member as shown in FIGURE 2. It will be observed that the outer diameter of the annulus is substantially the same as the inner diameter of the diffuser blade 20 so that the latter serves to retain the bezel portion in the proper position with respect to the enlarged groove. In the preferred form, the annulus 38 consists of a flat, thin strip of aluminum having a thickness between .002 and .010 inch.

Thereafter the reflector portion 36 of the reflector button is positioned over the bezel portion and into the die construction as seen in FIGURE 2. The body of the reflector portion is of a diameter slightly less than the outer diameter of the bezel portion so that an annular portion of the coating 40 is exposed and not covered by the reflector portion. Four integral radially extending projections 42 of equal length are formed with the reflector portion and serve as locators for contacting the inner wall of the diffuser blade 20 so as to centrally position the reflector portion within the die construction.

The reflector portion is preferably a preform comprising a transparent sheet 44 of acrylic resin such as methyl methacrylate which is bonded to an opaque sheet 46 of polyvinyl chloride through a layer 48 of vinyl adhesive which has a plurality of spherical glass beads or reflecting elements 50 embedded therein. The reflecting elements have a uniform diameter of approximately .001 inch and are provided in sufficient number so as to, in effect, form a planar wall between the sheets 44 and 46. This wall of beads or reflecting elements serve to reflect light which passes through the sheet of acrylic resin.

After the bezel portion 34 and reflector portion 36 are positioned as shown in FIGURE 2, a base sheet 52 made from a thermoplastic such as polyvinylchloride is then placed on the die construction. As seen in FIGURE 2, the base sheet 52 is the cover sheet of the trim panel 32 which includes a backing sheet 54 and a riser or filler material 56. The backing sheet can be made from a flexible material such as fabrics formed of cotton, wool, rayon, glass fibers, synthetic fibers, etc., paper, leather, etc., as well as rigid and semi-rigid materials such as composition board, fiber board, paper laminates, synthetic sheets and metals. The riser material should be made from a material capable of taking a permanent set under the influence of heat and pressure. In this instance, the riser material is a "felt" material which consists of a blend of torn-up waste paper and rags suitably blended to provide requisite strength as described in Patent No. 3,052,787 assigned to the assignee of this invention.

Figure 3:
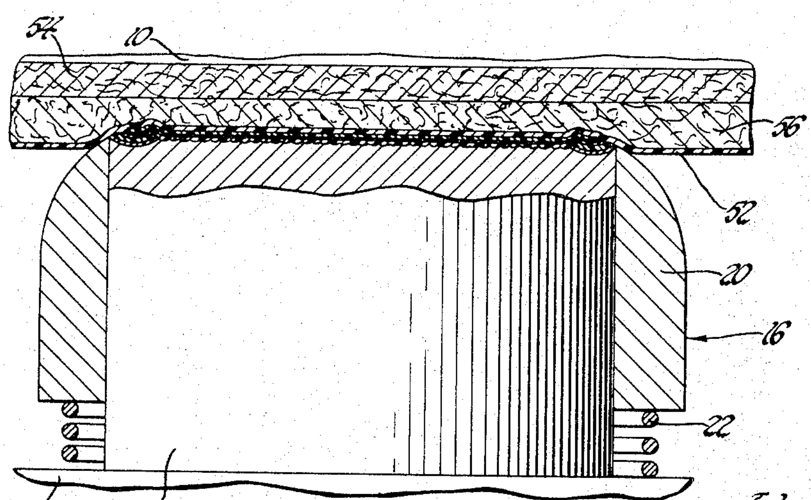
FIGURE 3 is a view similar to FIGURE 2 showing the reflector button after the application of pressure and electrical energy.

With the various parts being located, as seen in FIGURE 2, the dielectric heating press is then closed by lowering the upper electrode 10 toward the lower electrode 12 so as to compress the materials therebetween and cause the diffuser blade 20 to retract. Thereafter, a pressure between 500 and 1200 p.s.i. is applied to the sandwich of materials so as to permit the embossing member 18 to partially deform the bezel portion 34 into an arcuate cross section as seen in FIGURE 3. An alternating electric field having a frequency between one and 100 megacycles is then impressed between the electrodes to heat the thermoplastic materials and permit embossment of the face of the sheet 44 into a plurality of concentric grooves corresponding to those in the upper surface of the embossing member. Simultaneously, the coating 46 is bonded to the sheet 44 and base sheet 52, while the sheet 46 is also bonded to the latter-mentioned base sheet. Thus, the bezel and reflector portion are formed and bonded to the base sheet of the trim panel to form the ornamental reflector button shown in FIGURE 6.

An important feature of this invention is the simultaneous bonding and forming of the annulus 38 so as to simulate a rim or bezel around the reflector portion. As would be apparent to one skilled in the art, this portion of the process can be utilized alone for purposes of forming molding strips, ornamental buttons, etc., frequently preformed and mechanically fastened on the trim panels of an automobile. By utilizing a metallic element in accordance with the invention one achieves a secondary electrode during the process in a manner explained in detail in Patent No. 3,107,190, issued Oct. 15, 1963, and assigned to the assignee of this invention. Additionally, it should be noted that during the heating cycle, the thermoplastic layers interposed between the annulus 30 and the riser material 56 are softened and thereby permit the embossing member 18 to further form and embed the inner and outer edges of the annulus into the trim panel. This, of course, is possible due to the yieldable layers of material interposed between the annulus and the backing sheet 54. In other words, in order to realize sufficient deformation of the annulus from an appearance standpoint, it is necessary to have some form of yieldable material placed between the thermoplastic base sheet onto which the annulus is to be secured and the electrode opposite to that contacting the annulus.

Another significant feature of this invention is the embossment of the sheet 44 of acrylic resin by the embossing member so as to present surfaces that are inclined to the plane of the reflector portion. As described above, this is accomplished by providing the circular grooves in the surface of the acrylic sheet so as to form a series of inverted V-shaped peaks. Thus, where an observer's line of vision strikes the face of the reflector button, light rays entering the reflector portion are diffused and reflected toward him by the glass beads. This is especially important where the reflector button is formed on an automobile door trim panel because it will permit the button to reflect light whether the door is partially or fully open or anywherebetween these two positions.

Various changes and modifications can be made in the above-described process without departing from the spirit of the invention. Accordingly, the inventors do not wish to be limited except by the scope of the appended claim.

We claim:

1. In combination with a vehicle door trim panel having a cover sheet of thermoplastic material, a dielectric heat and pressure embossed reflector assembly comprising, a sheet of opaque vinyl fused to the cover sheet, a sheet of translucent acrylic resin having a plurality of V-shaped grooves formed in one surface thereof, a layer of adhesive having a plurality of glass beads disposed therein for hermetically bonding the entire other surface of the acrylic sheet to the vinyl sheet, said glass beads forming a planar wall between said sheets and serving to reflect light which passes through the sheet of acrylic resin, and a metallic rim surrounding the sheet of acrylic resin and fused to the cover sheet.

References Cited

UNITED STATES PATENTS

| | | | |
|---|---|---|---|
| 2,703,773 | 3/1955 | Stimson | 350—103 |
| 2,713,286 | 7/1955 | Taylor | 350—105 |
| 2,993,806 | 7/1961 | Fisher et al. | 117—71 |
| 3,140,340 | 7/1964 | Weber | 350—103 |

FOREIGN PATENTS

| | | |
|---|---|---|
| 433,810 | 8/1935 | Great Britain. |
| 913,175 | 12/1962 | Great Britain. |

JEWELL H. PEDERSEN, *Primary Examiner.*

C. QUARTON, *Assistant Examiner.*